United States Patent Office 3,726,860
Patented Apr. 10, 1973

3,726,860
SEMICARBAZIDOPENICILLIN SACCHARIMIDES
James L. Diebold, 6 Raymond Road, Broomall, Pa. 19008, and Milton Wolf, 1100 W. Chester Pike, Chester, Pa. 19013
No Drawing. Filed June 3, 1971, Ser. No. 149,847
Int. Cl. C07d 99/16
U.S. Cl. 260—239.1
2 Claims

ABSTRACT OF THE DISCLOSURE

Novel substituted semicarbazidopenicillanic acid saccharimido derivatives have been prepared which are useful antibacterial agents.

Description of the invention

The invention is concerned with novel antibacterial compounds of Formula I:

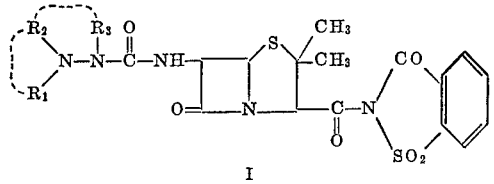

wherein $R_1$ is selected from the group consisting of (lower) alkyl, phenyl, halophenyl, (lower)alkoxyphenyl, (lower) alkylphenyl, (lower)alkylphen(lower)alkyl, lower(alkoxy)phen(lower)alkyl, halophen(lower)alkyl, phen-(lower)alkyl, 2-pyridyl, 3-pyridyl, 4-pyridyl, 2-imidazolyl and 4-imidazolyl;

$R_2$ is selected from the group consisting of (lower) alkyl, (lower)alkanoyl, phenyl, halophenyl, (lower) alkoxyphenyl, (lower)alkylphenyl, phen(lower)alkanoyl, halophen(lower)alkanoyl, (lower)alkylphen(lower)alkanoyl, benzoyl, halobenzoyl, (lower)alkylbenzoyl, (lower) alkoxybenzoyl, isonicotinoyl, 2-pyridyl, 3-pyridyl, 4-pyridyl, 2-imidazolyl, 4-imidazoyl, 2-pyrrolyl, 3-pyrrolyl, phen(lower)alkyl, halophen(lower)alkyl, (lower)alkylphen(lower)alkyl, (lower)alkoxyphen(lower)alkyl, $R_4SO_2-$ wherein $R_4$ is selected from the group consisting of (lower)alkyl, phenyl, halophenyl, (lower)alkoxyphenyl, (lower)alkylphenyl, phen(lower)alkyl, 2-pyridyl, 3-pyridyl and 4-pyridyl;

$R_1$ and $R_2$ may be concatenated to form a radical selected from the group consisting of piperidino, morpholino, N-alkyl-piperazino, pyrrolidino and imidazolino; when $R_1$ and $R_2$ are not concatenated, $R_2$ and $R_3$ may be concatenated to form a heterocyclic structure selected from the group consisting of perhydro pyrazole and perhydro pyridazine.

$R_3$ is selected from the group consisting of hydrogen, (lower)alkyl, (lower)alkanoyl, phen(lower)alkanoyl, benzoyl, halobenzoyl, (lower)alkoxybenzoyl, halophen-(lower) alkanoyl, (lower) alkylphen (lower) alkanoyl, (lower)alkoxyphen(lower)alkanoyl, (lower)alkylbenzoyl; $R_1$ and $R_2$ may both be direct bonds attached to a single radical selected from the group consisting of (lower) alkylidene, benzylidene, phen(lower)alkylidene and substituted forms thereof.

As used herein and in the appended claims the term (lower)alkyl is used to include straight and branched chain hydrocarbon radicals containing from one to about six carbon atoms such as methyl, ethyl, n-propyl, i-propyl, n-butyl, n-pentyl, etc. The term halo and halogen are used to include chlorine, fluorine, bromine and iodine. By the term (lower)alkanoyl is meant to include acyl groups containing one to about six carbon atoms such as formyl, acetyl, propionyl, butyryl, etc. The term (lower)alkoxy is used herein to include groups such as methoxy, ethoxy, propoxy, butoxy and the like.

The novel compounds of this invention may be prepared by reacting the saccharimide of 6-isocyanatopenicillanate with appropriate hydrazine derivative:

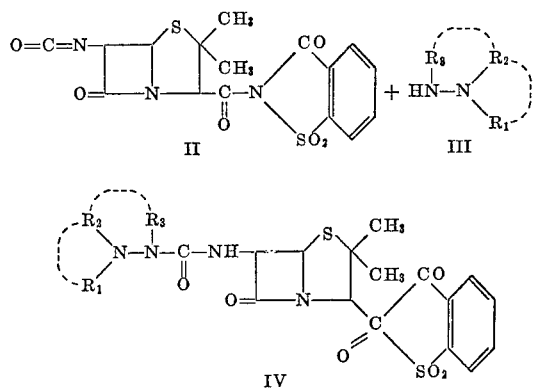

wherein $R_1$, $R_2$ and $R_3$ are the same as hereinabove described.

The compounds wherein $R_2$ and $R_3$ are concatenated are prepared by selecting as the hydrazine reactant, an appropriate cyclic hydrazine.

The hydrazines are reacted with the saccharimide of 6-isocyanatophenicillanic acid in an anhydrous organic solvent such as toluene, benzene, methylene chloride, etc. After the hydrazines have reacted with the saccharimide of 6-isocyanatopenicillanic acid according to the reaction set forth above, the novel intermediates of the invention may be isolated by evaporating the solvent in vacuo. Optionally the free semicarbazidopenicillanic acid compounds may be prepared by hydrolytic cleavage of the saccharimido group.

The novel compounds of the invention are antibacterial agents useful in treating bovine mastitis and other infections amenable to therepy with penicillanic acid derivatives such as benzylpenicillin. They are also useful as growth promoters for ruminant animals such as cattle. The compounds of the invention are also useful for the inhibition of *Staph. aureus*, Smith at a concentration of less than 10 micrograms/ml. when applied in an aqueous vehicle.

The saccharimide of 6-isocyanatopenicillanic acid may be prepared by methods set forth in U.S. patent application Ser. No. 149,817, filed of even date herewith and bearing attorney's docket number AHP-5464 in the names of Milton Wolf, James Diebold and Scott J. Childress, and titled, "Amides of 6-Isocyanatopenicillanic Acid."

EXAMPLE 1

4-[3,3-dimethyl-7-oxo-2-(3-oxo - 1,2 - benzisothiazolin-2-ylcarbonyl) - 4 - thia-1-azabicyclo[3.2.0]hept-6-yl]-1-methyl-1-phenylsemicarbazide S',S'-dioxide To a solution of 3.0 g. (0.00735 m.) of 2-[6-isocyanato-3,3 - dimethyl-7-oxo-4-thia-1-azabicyclo[3.2.0]hept-2-yl) carbonyl]-1,2-benzisothiazolin-3-one 1,1-dioxide in 50 ml. of dried methylene chloride at −45° C. was slowly added 0.895 g. (0.00735 m.) of unsym-N,N-phenylmethyl hydrazine in 20 ml. of dried methylene chloride. The solution was stirred for 1 hr. at −45° C. and then another hour at 25° C. The solvent was removed by evaporation leaving a solid.

IR (KBr) absorption maximum 3.0μ, 5.6μ, 5.75μ, 5.95μ, 6.6μ. Iodometric assay 60%.

EXAMPLE 2

The following compounds of the invention are prepared according to the procedure of Example 1 by substituting the appropriate hydrazine:

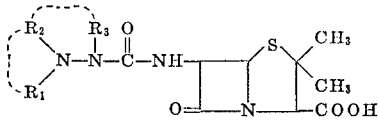

| $R_1$ | $R_2$ | $R_3$ |
|---|---|---|
| —$C_2H_5$ | —$C_2H_5$ | H |
| —$nC_3H_7$ | —$nC_3H_7$ | —$CH_3$ |
| —⌬ (phenyl) | —C(=O)—$CH_3$ | —$C_2H_5$ |
| —⌬—Cl | —⌬ | —$nC_3H_7$ |
| —⌬—$OCH_3$ | —⌬—Br | —$nC_4H_9$ |
| —⌬—$CH_3$ | —⌬—$OCH_3$ | —⌬ |
| —⌬—F | —⌬—$OC_2H_5$ | —H |
| —⌬—I | —⌬—$C_2H_5$ | —C(=O)—$CH_3$ |
| —$CH_2$—⌬ | —C(=O)—$CH_2$—$CH_3$ | —C(=O)—⌬ |
| —$CH_2$—$CH_2$—⌬ | —$CH_2$—⌬ | —$CH_2$—$CH_2$—$CH_3$ |
| —$CH_2CH_2CH_2$—⌬— | —$CH_2$—$CH_2$—$CH_2$—⌬ | —C(=O)—$CH_2$—⌬ |
| —$CH_2$—⌬—Cl | —$CH_2$—⌬—Cl | —C(=O)—⌬—Cl |
| —$CH_2$—⌬—Br | —C(=O)—⌬ | —C(=O)—⌬—$CH_3$ |
| —⌬—$OCH_2CH_2$—$CH_3$ | —⌬—$OCH_2CH_2$—$CH_3$ | H |
| —⌬—$CH_2$—$CH_2$—$CH_3$ | —⌬—$CH_2$—$CH_2$—$CH_3$ | —C(=O)—$CH_2$—⌬—Cl |
| —$CH_2$—$CH_2$—⌬—Cl | —$CH_2$—$CH_2$—⌬—Cl | —C(=O)—$CH_2$—⌬ |
| (pyridyl) | $CH_3$ | H |
| (pyridyl) | $C_2H_5$ | —H |
| (pyridyl) | $CH_3$ | H |
| (imidazolyl) | $CH_3$ | H |

TABLE—Continued

| R₁ | R₂ | R₃ |
|---|---|---|
| 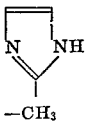 | CH₃ | H |
| —CH₃ | 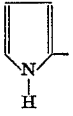 | H |
| —C₂H₅ | 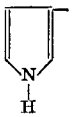 | H |
| —CH₃ | —SO₂—CH₃ | —CH₃— |
| —C₂H₅ |  | —CH₃ |
| —CH₃ | 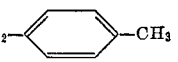 | —H |
| —CH₃ | 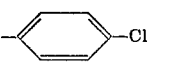 | —H |
| —C₂H₅ | 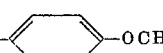 | —H |
| —CH₃ | 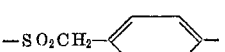 | —H |
|  |  | —H |
| CH₂—CH₂—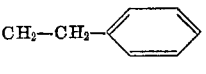 |  | H |
| CH₃ | 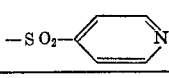 | —H |

| R₁ | R₂ | R₃ |
|---|---|---|
| CH₃—N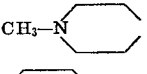 | ———— | CH₃ |
| O | ———— | H |
|  | ———— | H |
| N | ———— | CH₃ |

| R₁ | R₂ | R₃ |
|---|---|---|
| —CH₃ | 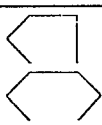 | |
| —CH₃ | | |

We claim:
1. A compound of the formula:

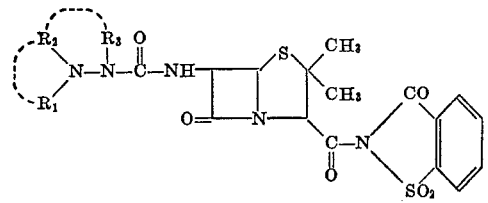

wherein
R₁ is selected from the group consisting of (lower) alkyl, phenyl, halophenyl, p-(lower)alkoxyphenyl, p-(lower)alkylphenyl, p-chlorophen(lower)alkyl, phen(lower)alkyl, 2-pyridyl, 3-pyridyl, 4-pyridyl, 2-imidazolyl and 4-imidazolyl;
R₂ is selected from the group consisting of (lower) alkyl, (lower)alkanoyl, p-(lower)alkoxyphenyl, p-(lower)alkylphenyl, benzoyl, 2-pyrrolyl, 3-pyrrolyl, phen(lower)alkyl, p-chlorophen(lower)alkyl, and R₄SO₂— wherein R₄ is selected from the group consisting of methyl, phenyl, p-tolyl, p-chlorophenyl, p-methoxyphenyl, benzyl, 2-pyridyl, 3-pyridyl and 4-pyridyl;

$R_1$ and $R_2$, when concatenated form a radical with the nitrogen atoms to which they are attached, selected from the group consisting of morpholino, N-methylpiperazino, pyrrolidino and imidazolino;

$R_3$ is selected from the group consisting of hydrogen, (lower)alkyl, acetyl, phenacetyl, p-chlorophenacetyl, benzoyl, p-chlorobenzoyl and p-methylbenzoyl; and $R_2$ and $R_3$, when concatenated form a heterocyclic structure with the nitrogen atoms to which they are attached selected from the group consisting of perhydropyrazole and perhydropyridazine.

2. A compound as defined in claim 1, which is: 4-[3,3-dimethyl-7-oxo-2-(3-oxo-1,2-benzisothiazolin - 2 - ylcarbonyl)-4-thia-1-azabicyclo[3.2.0]hept-6-yl] - 1 - methyl-1-phenylsemicarbazide S',S'-dioxide.

References Cited
UNITED STATES PATENTS

| | | | |
|---|---|---|---|
| 3,652,546 | 3/1972 | Cheney et al. | 260—239.1 |
| 3,652,547 | 3/1972 | Wolf et al. | 260—239.1 |
| 3,652,254 | 3/1972 | McCaully et al. | 260—239.1 |

NICHOLAS S. RIZZO, Primary Examiner

U.S. Cl. X.R.

424—271